United States Patent [19]

Yeh et al.

[11] Patent Number: 5,492,177

[45] Date of Patent: Feb. 20, 1996

[54] METHOD FOR CONSOLIDATING A SUBTERRANEAN FORMATION

[75] Inventors: Charles S. Yeh, Plano; E. Thomas Strom, Dallas; Larry L. Cox, Carrollton, all of Tex.

[73] Assignee: Mobil Oil Corporation, Fairfax, Va.

[21] Appl. No.: 347,918

[22] Filed: Dec. 1, 1994

[51] Int. Cl.$^6$ ................................................. F21B 33/138
[52] U.S. Cl. ........................................ 166/295; 166/300
[58] Field of Search ....................................... 166/294, 295, 166/288, 300

[56] References Cited

U.S. PATENT DOCUMENTS

| | | | |
|---|---|---|---|
| 2,770,306 | 11/1956 | Clark, Jr. | 166/295 X |
| 3,176,769 | 4/1965 | Treadway et al. | 166/295 |
| 3,412,796 | 11/1968 | Dekking | 166/295 |
| 3,719,050 | 3/1973 | Asao et al. | |
| 4,193,453 | 3/1980 | Golinkin | 166/295 |
| 4,875,525 | 10/1989 | Mana | 166/280 |
| 5,082,057 | 1/1992 | Sydansk | 166/295 |

Primary Examiner—George A. Suchfield
Attorney, Agent, or Firm—Alexander J. McKillop; George W. Hager, Jr.

[57] ABSTRACT

A method for consolidating a subterranean formation to control the production of particulates therefrom. A specific consolidating solution comprised of an allyl monomer and an initiator is injected into the formation where it is allowed to set at an elevated temperature to harden and form a permeable, consolidated mass. The allyl monomer is an allyl ester selected from the group of diallyl orthophthalate, diallyl isophthalate, diallyl terephthalate, diallyl benzenephosphonate, diethylene glycol bis (allyl carbonate) and other known allyl monomers and the initiator is preferably a peroxy compound (e.g. benzoyl peroxide, diisopropyl peroxydicarbonate, etc.) or an azo compound (e.g. 4,4'-azobis(4-cyanovaleric acid). A diluent such as an alcohol (e.g. isopropyl alcohol or isobutyl alcohol) or a mutual solvent (e.g. ethylene glycol monobutyl ether, diacetin, triacetin, acetone, etc.) and a coupling agent (e.g. an organofunctional silane) may be added if needed.

20 Claims, No Drawings

METHOD FOR CONSOLIDATING A SUBTERRANEAN FORMATION

TECHNICAL FIELD

The present invention relates to a method for treating a subterranean formation and in one of its aspects relates to a method.

BACKGROUND

In producing hydrocarbons or the like from loosely or unconsolidated and/or fractured subterranean formations, it is not uncommon to produce large volumes of particulate material (e.g. sand) along with the formation fluids. These particulates routinely cause a variety of problems which result in added expense and substantial downtime. For example, in most instances, particulates in the produced fluids cause (1) severe erosion of the well tubing and other production equipment; (2) partial or complete clogging of the flow from the well which requires workover of the well; (3) caving in the formation and collapse of the well casing; (4) extra processing of the fluids at the surface to remove the particulates; and (5) extra cost in disposing of the particulates once they have been separated. Accordingly, it is extremely important to control the production of particulates in most operations.

One widely used technique for controlling the production of particulates (e.g. sand) from a well is that which is known as "gravel packing". In a typical gravel pack completion, a screen is lowered into the wellbore and positioned adjacent the interval of the well which is to be completed. Particulate material, collectively referred to as gravel, is then pumped as a slurry down the well and into the annulus which is formed between the screen and the well casing or open hole, as the case may be, to deposit the gravel around the screen. The gravel is sized so that it forms a permeable mass which allows fluid flow into the screen while blocking the flow of any particulates produced with the fluids. While gravel packing is well established for completing loose, sand-producing formations, its cost in both new completions or workovers is substantial which may seriously effect the overall economics of a well.

Another usually less expensive technique for controlling sand production from a formation involves the injection of a consolidating agent or solution into the pore space of the formation at and near the wellbore. Examples of such consolidating agents include plastics such as phenolformaldehyde, furan resins, and epoxy resins.

The consolidating agent is flowed down the wellbore and is forced under pressure into the formation where it normally penetrates for a distance of several inches to several feet where it occupies the pore spaces and envelopes the sand grains of the formation. Under the influence of the elevated temperature in the formation, after a few hours, the agent polymerizes and hardens. As it does so, it shrinks to about one-half to about One-third of its original liquid volume, leaving much of the pore space in the treated area or zone of the formation open for fluid flow. At the same time, the consolidating agent coats the sand grains and cements them together into a consolidated, permeable mass.

While the treated or consolidated zone of the formation will lose some permeability, there is normally sufficient permeability left in the consolidated sand mass to allow adequate flow of fluids therethrough. The consolidating agent used must be one which is chemically inert and permanent in nature after the agent becomes solidified in that it must be substantially unaffected by subsequent contact with any of the formation fluids, e.g. oil, gas, and/or water. Consolidating agents of this type must have a sufficiently low initial viscosity to allow it to freely enter the near-wellbore formation. Further, the agent must set within a reasonable time at the temperature of the formation to be consolidated.

In some instances, a "wetting" agent may be added to the consolidating solution to assist in displacing oil and water from the sand grains to insure a good bond between the consolidated solution and the sand grains. Also, an accelerator or the like can be added to the solution or pumped separately into the wellbore to adjust the setting time of the consolidating solution. Sand grains cemented together with a good consolidating agent forms a rock matrix that is firm and hard and nearly as strong in its resistance to compressive forces as natural sandstone, in which the sand grains are cemented by siliceous or calcareous materials.

The present invention provides a method using still another consolidating agent which is capable of being placed into the pore space of a near-wellbore zone of a subterranean formation and which will, when allowed to set at the elevated temperature of the formation, will harden or solidify to produce a strongly-bonded, permeable rock-like matrix which is substantially unaffected by the formation fluids, thereby controlling the production of sand grains from the treated zones.

SUMMARY OF THE INVENTION

The present invention provides a method treating a loosely-consolidated zone of a subterranean formation to consolidate the loose particulate material (e.g. sand grains) within the treated zone to control the production of sand therefrom. In the present method, a specific consolidating agent or solution comprised of an allyl monomer and an initiator is injected through a wellbore which traverses the loosely-consolidated zone into the near-wellbore formation where it is allowed to set for a prescribed time in order for the solution to polymerize and a permeable, rock-like consolidated sand mass in the near-wellbore formation.

The allyl monomer used to form the present consolidating solution is an allyl ester selected from the group of diallyl orthophthalate, diallyl isophthalate, diallyl terephthalate, diallyl benzenephosphonate, diethylene glycol bis(allyl carbonate) and other known allyl monomers. The initiator is preferably a peroxy compound (e.g. benzoyl peroxide, diisopropyl peroxydicarbonate, etc.) or an azo compound (e.g. 4,4'-azobis (4-cyanovaleric acid)). The allyl monomer and the initiator may be mixed and injected together or they may be sequentially injected into the formation.

The actual composition of a particular consolidation solution in accordance with the present invention will be basically predicated on the temperature of the selected zone which is to be treated. The solution will have to be liquid and readily pumpable at ambient temperature and be capable of polymerization (i.e. hardening) at the temperature within the loosely-consolidated zone. In most instances, a diluent will be added to adjust the characteristics of the consolidation solution to those required for a particular formation. The diluent may be an alcohol (e.g. isopropyl alcohol or isobutyl alcohol) or a mutual solvent (e.g. ethylene glycol monobutyl ether, diacetin, triacetin, acetone, etc.).

The mixing of the allyl monomers, initiator, and diluent results in a pumpable solution which will remain stable at ambient temperatures but will polymerize at the elevated temperatures in the subterranean formation into which it is injected. As the temperature of the consolidation solution rises, the solution becomes more viscous until it hardens to bond the particulate material (e.g. sand grains) into a permeable, consolidated mass. The consolidating solution is allowed to set for a prescribed curing time which may range from hours to days, depending on the chemical composition of the consolidating solution and the temperature in the treated zone..

Where extra strength may be required, a coupling agent (e.g. an organofunctional silane) may be added to the consolidating solution in a weight concentration of about 5% or less. The coupling agent will enhance the bonding strength between the inorganic sand in the treated zone and the organic allyl polymers. The zone to be consolidated may be pretreated with a preflush fluid (e.g. a solvent) to displace residual oil and/or water from the surfaces of the sand grains in the near-wellbore formation.

Further, to enhance the final permeability of the consolidated mass, a post-flush fluid (e.g. a mutual solvent or a gas such as $CO_2$, nitrogen, or the like) can be injected into the formation while the consolidating solution is curing and circulated through the wellbore to remove any unwanted consolidating solution from the wellbore.

BEST KNOWN MODE FOR CARRYING OUT THE INVENTION

In accordance with the present invention, a method is provided for treating a loosely-consolidated zone of a subterranean formation to consolidate the loose particulate material (e.g. sand grains) within the treated zone to control the production of sand therefrom. In the present method, a specific consolidating agent or solution comprised of an allyl monomer and an initiator is injected through a wellbore which traverses the loosely-consolidated zone into the near-wellbore formation where it is allowed to set for a prescribed time in order for the solution to polymerize and a permeable, rock-like consolidated sand mass adjacent the wellbore.

The specific consolidating agent or solution of the present invention is comprised of an allyl monomer and an initiator. The allyl monomer is an allyl ester selected from the group of diallyl orthophthalate, diallyl isophthalate, diallyl terephthalate, diallyl benzenephosphonate, diethylene glycol bis-(allyl carbonate) and other known allyl monomers. Most of these allyl monomers are commercially available, e.g. diethylene glycol bis(allyl carbonate) is available under the trademark "CR-39" Monomer, from PPG Industries, Pittsburg, Pa.

The initiator is preferably a peroxy compound (e.g. benzoyl peroxide, diisopropyl peroxydicarbonate, etc.) or an azo compound (e.g. 4,4'-azobis(4-cyanovaleric acid). The polymerization of the allyl ester with the initiator can begin with a allyl monomer, allyl oligomer, or any combination thereof. In addition, copolymerization is possible if the above-identified diallyl compounds are mixed with a monoallyl compound (e.g. allyl benzoate). It should be understood that the initiator may be mixed and injected with the allyl monomer and/or it may be injected separately after the allyl monomer is in place within the formation.

The actual composition of a particular consolidation solution in accordance with the present invention will be basically predicated on the temperature and the particular characteristic of the subterranean zone which is to be treated. The solution will have to be liquid and readily pumpable at ambient temperature and be capable of polymerization (i.e. hardening) at the temperature within the selected zone. In most instances, a diluent will be added to adjust the properties of the consolidation solution to those required by a particular formation.

The diluent may be an alcohol (e.g. isopropyl alcohol or isobutyl alcohol) or a mutual solvent (e.g. ethylene glycol monobutyl ether, diacetin, triacetin, acetone, etc.). As pointed out above, the actual composition of a particular consolidation solution may vary depending on the looseness of the formation, the ambient and formation temperatures, setting times, formation fluids, etc., but the weight percentages will be in the following ranges:

allyl monomers: about 30% to about 99% initator: about 0.5% to about 10% diluent: 0% to about 70%

The mixing of the allyl monomers, initiator, and diluent results in a homogeneous and readily pumpable solution which will remain stable at ambient temperatures but will polymerize at the elevated temperatures in the selected subterranean zone into which it is injected. As the temperature of the consolidating solution rises, the solution becomes more viscous until it hardens to bond the particulate material (e.g. sand grains) into a permeable, consolidated mass. The consolidating solution is allowed to set in the treated zone for a prescribed curing time which may range from hours to days, depending on the chemical composition of the consolidating solution and the temperature in the treated zone.

Where extra strength may be required, a coupling agent (e.g. an organofunctional silane) may be added to the consolidating solution in a weight concentration of about 5% or less. The coupling agent will enhance the bonding strength between the consolidating agent and the inorganic sand in the treated zone.

In carrying out the present method, the loosely-consolidated zone may be pretreated by injecting a preflush fluid (e.g. a "wetting agent" such as a mutual solvent) to displace residual oil and/or water from the surfaces of the sand grains in the near-wellbore formation. Further, if necessary to enhance the final permeability of the consolidated mass, a post-flush fluid (e.g. a mutual solvent or a gas such as $CO_2$, nitrogen, or the like) can be injected into the formation while the consolidating solution is setting. In some instances, instead of mixing and injecting the initiator with the allyl monomers, it may be to mixed and injected with the post-flush fluid.

Also, in order to keep the consolidating solution from hardening and blocking flow in the wellbore, i.e. injection tubing, a mutual solvent (see examples set forth above) is circulated through the injection well tubing to displace and/or remove the unwanted consolidating solution from the wellbore after the desired volume of consolidating solution has been injected into the zone to be treated.

To further illustrate the present invention, the following examples are set forth:

EXAMPLE 1

A consolidating solution was formed by mixing 3 parts by weight of an allyl monomer (i.e. diallyl orthophthalate) with 7 parts of a diluent (i.e. isobutyl alcohol). An initiator (benzoyl peroxide) was added in an amount of 2% by weight of the solution. The consolidating solution was then injected into an unconsolidated 100 U.S. mesh sand pack at 73° C. and was allowed to set at this elevated temperature for 10 days. The resulting sand mass was solid but permeable to fluid flow.

EXAMPLE 2

A consolidating solution was formed by mixing 8 parts by weight of an allyl monomer (i.e. diallyl orthophthalate) with 2 parts of a diluent (i.e. ethylene glycol monobutyl ether). An initiator (benzoyl peroxide) was added in an amount of 2% by weight of the solution. The consolidating solution was then injected into an unconsolidated 100 U.S. mesh sand pack at 73° C. and was allowed to set at this elevated temperature for 7 days. The resulting sand mass was solid but permeable to fluid flow.

EXAMPLE 3

A consolidating solution was formed by mixing 1 part by weight of an allyl monomer (i.e. diethylene glycol bis (allyl carbonate)) with 1 part of a diluent (i.e. ethylene glycol monobutyl ether). An initiator (benzoyl peroxide) was added in an amount of 2% by weight of the solution. The consolidating solution was then injected into an unconsolidated 100 U.S. mesh sand pack at 73° C. and was allowed to set at this elevated temperature for 72 hours. The resulting sand mass was solid but permeable to fluid flow.

EXAMPLE 4

A consolidating solution was formed by mixing 2 parts by weight of an allyl monomer (i.e. diallyl orthophthalate) with 1 part of a diluent (i.e. isobutyl alcohol). An initiator (benzoyl peroxide) was added in an amount of 2% by weight of the solution. The consolidating solution was then injected into an unconsolidated 100 U.S. mesh sand pack at 73° C. and was allowed to set at this elevated temperature for 11 days. The resulting sand mass was solid but permeable to fluid flow and continued to show good strength after an extended period of water flushing at 73° C.

EXAMPLE 5

A consolidating solution was formed by mixing 3 parts by weight of a first allyl monomer (i.e. diethylene glycol bis (allyl carbonate)) and 3 parts by weight of a second allyl monomer (i.e. diallyl orthphthalate) with 2 parts of a diluent (i.e. ethylene glycol monobutyl ether). An initiator (benzoyl peroxide) was added in an amount of 2% by weight of the solution. The consolidating solution was then injected into an unconsolidated 100 U.S. mesh sand pack at 73° C. and was allowed to set at this elevated temperature for 72 hours. The resulting sand mass was solid but permeable to fluid flow.

What is claimed is:

1. A method for treating a loosely-consolidated zone of a subterranean formation to consolidate particulate material within said zone to control the production of particulates therethrough wherein a wellbore traverses said loosely-consolidated zone, said method comprising:

injecting a consolidating solution through said wellbore and into said loosely-consolidated zone; said consolidating solution being stable and pumpable at ambient temperature, said consolidating solution comprising: an allyl monomer and an initiator;

allowing said consolidating solution to set within said loosely-consolidate zone for a prescribed time period, said consolidating solution polymerizing at the elevated temperature within said loosely-consolidated zone wherein said consolidating solution hardens to bond said particulates together into a permeable, consolidated mass.

2. The method of claim 1 wherein said allyl monomer comprises:
    an allyl ester.

3. The method of claim 2 wherein said allyl ester is selected from the group of diallyl benzenephosphonate, diallyl orthophthalate, diallyl isophthalate, diallyl terephthalate, and diethylene glycol bis(allyl carbonate).

4. The method of claim 2 wherein said initiator comprises:
    a peroxy compound.

5. The method of claim 4 wherein said peroxy compound is selected from the group of benzoyl peroxide and diisopropyl peroxydicarbonate.

6. The method of claim 2 wherein said initiator comprises:
    an azo compound.

7. The method of claim 6 wherein said azo compound comprises: 4,4'-azobis(4-cyanovaleric acid).

8. The method of claim 1 wherein said consolidating solution includes a diluent.

9. The method of claim 8 wherein said diluent is an alcohol.

10. The method of claim 9 wherein said alcohol is selected from the group of isopropyl alcohol and isobutyl alcohol.

11. The method of claim 8 wherein said diluent is a mutual solvent.

12. The method of claim 8 wherein said mutual solvent is selected from the group of ethylene glycol monobutyl ether, diacetin, triacetin, and acetone.

13. The method of claim 8 wherein said consolidating solution is comprised of:
    about 30% to about 99%, by weight, of said allyl monomer;
    about 0.5 to about 10%, by weight, of said initiator; and
    0% to about 70% of said diluent.

14. The method of claim 8 wherein said consolidating solution includes a coupling agent to enhance the bonding strength of said consolidated mass.

15. The method of claim 14 wherein said coupling agent comprises an organofuctional silane 16. The method of claim 13 wherein said coupling agent forms less than about 5%, by weight, of said consolidating solution.

17. The method of claim 1 including:
    injecting a post-flush fluid through said wellbore and into said zone after said consolidating solution has been injected into said loosely-consolidated zone to enhance the permeability of said consolidated mass.

18. The method of claim 17 wherein said post-flush fluid comprises a mutual solvent.

19. The method of claim 17 wherein said post-flush fluid comprises a gas.

20. The method of claim 1 including:
    circulating a solvent through said wellbore after said consolidating solution has been injected into said selected zone to remove unwanted consolidated solution from the wellbore.

* * * * *